Dec. 27, 1955  J. E. SWANSON  2,728,694
SUGAR JUICE CLARIFIER
Filed Feb. 15, 1952  2 Sheets-Sheet 1

INVENTOR.
JALMER E. SWANSON
BY
F. D. Prager
ATTORNEY.

Dec. 27, 1955     J. E. SWANSON     2,728,694
SUGAR JUICE CLARIFIER

Filed Feb. 15, 1952     2 Sheets-Sheet 2

*INVENTOR.*
JALMER E. SWANSON
BY
F. D. Prager
ATTORNEY

United States Patent Office 2,728,694
Patented Dec. 27, 1955

2,728,694

SUGAR JUICE CLARIFIER

Jalmer E. Swanson, Chicago, Ill., assignor to Graver Tank & Mfg. Co., Inc., East Chicago, Ind., a corporation of Delaware Application February 15, 1952, Serial No. 271,757

7 Claims. (Cl. 127—13)

This invention relates to sugar juice clarifiers: that is, tanks wherein so-called "raw" sugar juice is treated for the removal of impurities by "sedimentation."

The new clarifier uses what can be described as a specially formed and controlled "deep sludge bed," providing a sludge contact reaction suitable for sugar juice treatment. In order to obtain this reaction the juice is caused to flow through and from a preliminary flocculation zone into the narrow and elongated bottom part of a sludge zone, as a flow uniformly distributed along the entire length of that part. It is then caused to rise through the sludge zone at velocities which are gradually reduced from the bottom to the top of the sludge zone; preferably a gentle mechanical agitation is applied in the bottom part of the sludge zone, uniformly over its length. By means of this arrangement the new clarifier produces a sludge bed capable of purifying the sugar juice with excellent results; and it does not require the settling trays and movable scrapers which heretofore were necessary for comparable results. The new clarifier is efficient and economical both in large plants and when built in small sizes; the latter being an application for which there is a growing need.

The invention is based upon particular observation relating to the sugar juice that is treated in the clarifier and to the mud particles and other side products. The so-called "raw" juice is preheated, usually to a temperature where it tends to release steam vapors and scum or froth bubbles when exposed. It contains large amounts of sludge, also called mud, which comprise a variety of insoluble or poorly soluble impurities such as humus, cell substance, fiber or bagacillo, a variety of waxy substances, and an abundance of bacteria etc. The waxy material makes the fibers etc. sticky, adhesive and cohesive. The bacteria tend to cause septic and other adverse conditions in the organic solutions. These facts have made a so-called deep-bed sludge contact reaction impossible, in past efforts to clarify sugar juice. The present design makes such a reaction possible, whereby it produces distinct economies and operating advantages.

These and other features will be understood more clearly upon consideration of the detail disclosure which follows.

Figure 1:
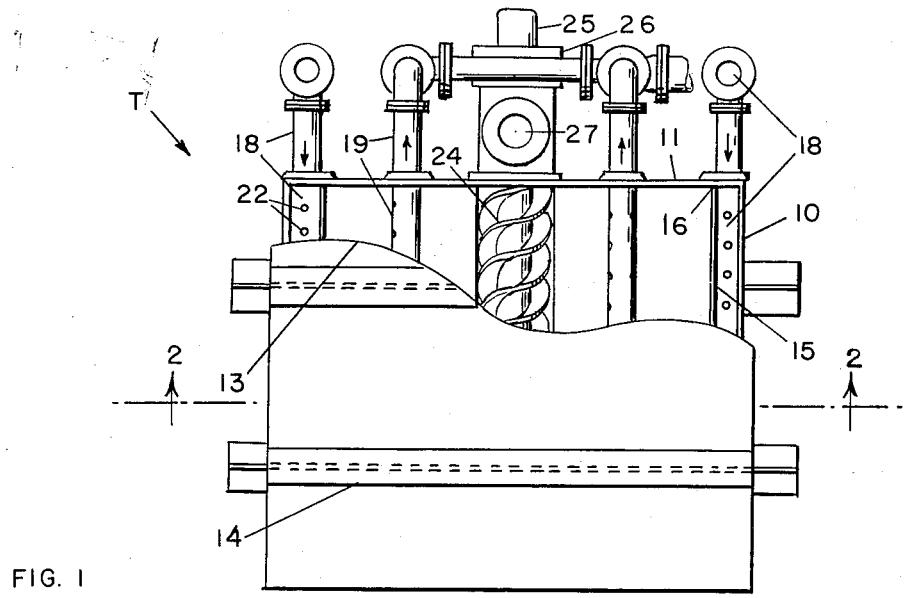
Figure 2:
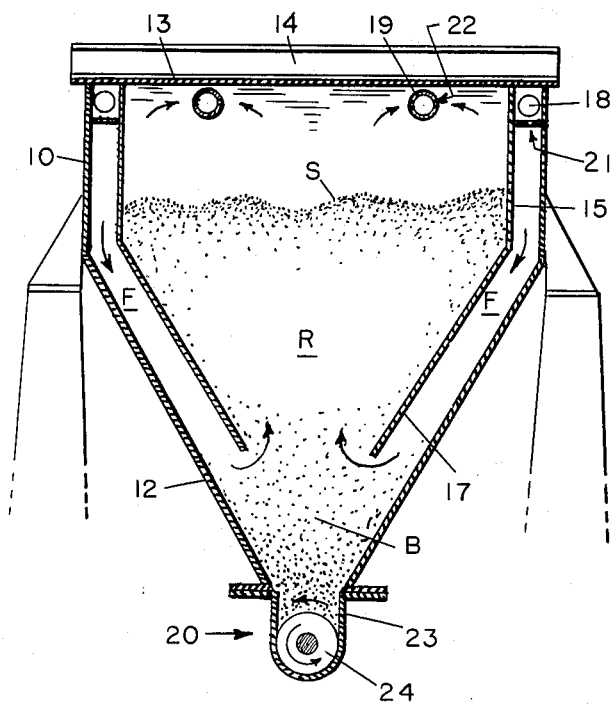

In the drawing Fig. 1 is a diagrammatic plan view of a preferred unit in accordance herewith; parts of the cover of the unit being removed. Fig. 2 is a sectional view of this unit, the section being taken along lines 2—2.

Figure 3:
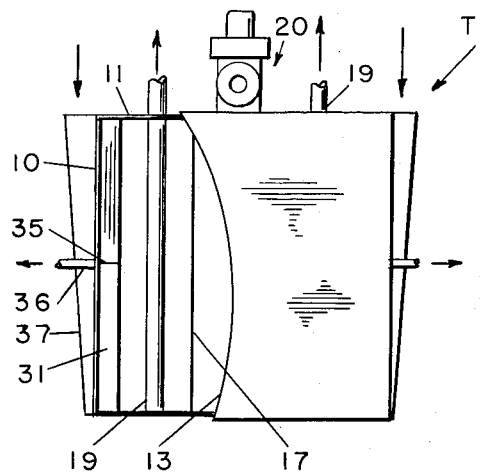
Figure 6:
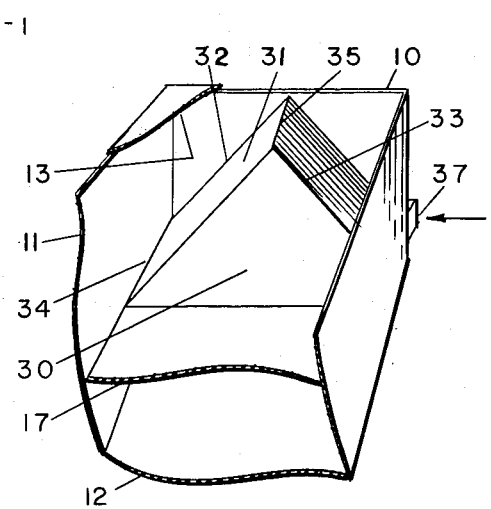
Figure 4:
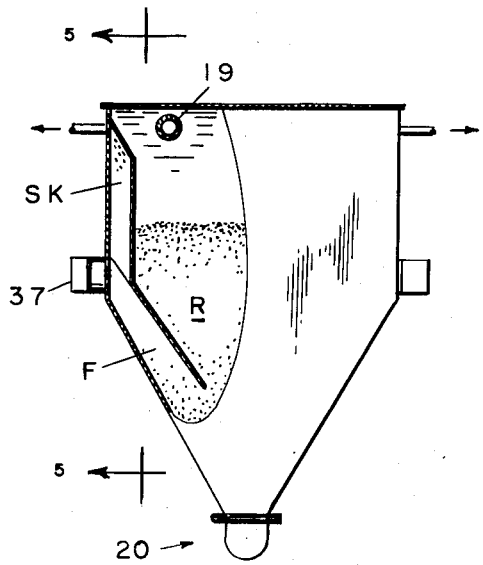
Figure 5:
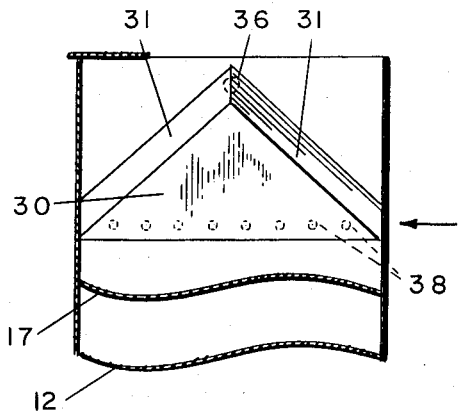

Figs. 3 and 4 show a modified unit hereunder, in views corresponding respectively with Figs. 1 and 2. Fig. 5 is a further sectional view of this unit, taken along lines 5—5 of Fig. 4. Fig. 6 is a partial perspective view of this unit.

Referring first to Figs. 1 and 2: the tank T is formed in part by a pair of side walls 10 opposite one another and a pair of end walls 11 interconnecting the side walls. As shown in the plan view, the side and end walls 10, 11 form a rectangular area. Either long or short sides of the rectangle can form the end walls 11. Often, the sides of the tank are about equal or accurately equal.

Both end walls 11 can be vertical throughout their height, as shown. The two side walls 10 are vertical only in their upper parts; they have inclined, converging lower parts 12. Thus the tank can be described as being formed by a prism of rectangular cross-section super-imposed on one of the three sides of a prism with triangular cross-section.

The tank of course has suitable supports, which may be secured to the side or end walls as shown. It has a flat cover 13 to close its top. The cover and walls may be reinforced by structural beams 14 on their outsides. The interior of the tank is divided by two partitions 15 into a generally narrow flocculation zone F and a generally wide sludge contact reaction, sludge filtration and clarification zone R.

Each partition 15 extends from the cover 13 towards the bottom part 12 of a sidewall 10 and then along that bottom part. The side edges 16 of each partition may be secured to the end walls 11. The upper part of each partition is vertical while its lower part 17 is inclined, both parts being approximately parallel with the adjoining side wall. The lower parts 12, 17 have sufficient slope to force gravitational downward flow of the mud to be settled out. This slope is well known to the art; it is generally about 50 to 65 degrees from the horizontal, depending on the particular type of sugar juice to be handled.

Preferably, the sloping lower parts 12, 17 of the side walls 10 and partitions 15 constitute major parts of the total depth thereof; that is, the part of the tank formed as a prism of triangular section is at least as deep as the superposed part of the tank, and preferably deeper. I have found this feature important for sugar juice clarification; more so than has apparently been considered in the past. The lower part of the sludge zone requires a long entrance, for proper sludge contact treatment as will be explained hereinafter. However, this part must have minimum volume and must be therefore as narrow as possible in order to minimize stagnation of mud and to avoid tendencies toward bacterial and other pollution of juice, excessive pH drop, fermentation, inversion etc. The wall structures 10, 11, 12, 17 satisfy these requirements, while providing a deep sludge bed and reaction area R. This area allows efficient treatment of the juice in a single passage upwards through a sludge bed, avoiding any contacting or re-contacting of juice and aged or stale mud.

In clarifiers for other liquids, vastly different considerations have been applied. It is usually preferred to utilize any given space or even area to the fullest extent possible, and accordingly to avoid the use of sloping side walls which occupy major parts of the tank depth. The clarifier tanks, accordingly, have usually had a flat bottom profile. Such tanks have been used extensively for sugar juice treatment. Conversely, tanks with pointed or narrow bottom zones have sometimes been used for liquid treatment. The present invention is partly based on the observation that it is important for best results in sugar juice clarification to use a long but narrow bottom zone.

Accordingly, I make the bottom part B of the reaction zone R horizontally elongated between the lower ends of the vertical end walls 11, and force the juice to flow from the flocculation zone F into and through the zone B along the entire length of the lower edge of the partition 17. I make the flow into and through the zone B as uniform as possible and rather slow and gentle. For this purpose the bottom edge mentioned and the entire partition 15 or at least its lower part 17 should extend horizontally to the same extent as does the mud zone B. Further, this uniform distribution is aided by inlet arrangements and mechanical eqiupment to be described hereinafter.

Up to now the benefits of mud or sludge contact have been applied with great success in the treatment of water, sewage and the like. Substantial efforts have also been made to provide such benefits in the treatment of sugar juice. However, I believe it is new in such treatment to provide the present controlled sludge contact and particularly to use a zone B as described. Of course, it is also important to use the basically well known upward and gradually expanding flow of the juice through the deep sludge bed or sludge filtration or reaction zone R.

In order to maintain these different flows, I provide inlet means 18 for sugar juice to be clarified, in an upper part of the flocculation zone F; outlet means 19 for clarified sugar juice, in an upper part of the reaction and clarification zone R; and outlet means 20 for excess sludge or mud in the zone B.

The inlet means 18 are shown in form of ducts extending horizontally along upper, vertical parts of side walls 10. These ducts discharge into the flocculation zone F through orifices 21 uniformly distributed along the side wall.

The outlet means 19 are shown in form of pipes extending horizontally through the upper part of the zone R and communicating therewith through orifices 22.

The sludge outlet means 20 is shown as located in a narrow elongated bottom sump 23 extending at and along the bottom parts of the side walls 12. Within and extending along this sump I provide a screw conveyor 24, which also extends through one of the end walls 11. Outside the tank and adjacent said end wall the conveyor is driven by a motor 25, through a speed reducer 26. It shifts concentrated mud positively but gently and without breakup or pulsation from the zone B into the mud outlet duct 27. In so doing, it also thickens the mud in a manner known by itself. Further, in so doing it provides gentle agitation for the zone B, such agitation being uniformly distributed along the length of the zone.

In normal operation the unit is filled to the top. Through inlet 18, raw sugar juice is constantly introduced and through outlet 19, clarified juice is constantly withdrawn. Preferably the withdrawal of sludge at 27 is also continuous.

A flocculation treatment with gentle agitation and resulting growth of settleable particles of impurity is applied adjacent the orifices 21, in the zone F. It will be understood that the juice is supplied to and through the duct 18 as a rapid, inherently turbulent flow, in order to avoid heat loss etc.; and that it is distributed along the side wall 10 and zone F, by a further rapid flow through the orifices 21. The rapid and turbulent flow in the supply duct and orifices 21 is generally unable to produce flocculation, and is indeed not intended to produce it, since the duct 18 should be kept clean. As the flow expands, past the orifices 21, turbulent eddy motion occurs at rapidly decreasing velocities, leading to the building up rather than disruption of solid particles or flocs. This building up is caused in known manner by different electrostatic charges on solid particles and is promoted both by the presence of waxy materials and by the gentle agitation described.

The built-up particles, having high specific gravity, may partly settle in the zone F. They will then slide down the walls 12 into the zones B and 20.

Other built-up particles reach the zone B in suspended condition, although tending to settle. They enter the lower part of the upflow zone R, where upward flow velocities are sufficient to keep at least the lighter ones of these particles suspended. However, there is further reduction in flow velocities and further build-up in the zones B, R, whereby all particles ultimately settle against the flow and no particles rise above a certain level, dependent on the type of particles and velocity of upflow. A sludge bed S can thus be maintained in the zone R. As the juice under treatment rises through this sludge bed, the sludge contact reaction takes place, resulting in the removal of extremely fine and light impurities.

Even colloids are removed in this bed. The same thing is true of impurities which otherwise tend to form a scum or foam. I have found it possible, by suitable flow velocities, to bring such materials through the zone F into the sludge bed S and to remove them from the juice by retention in the sludge bed.

Preferably the bottom area of the zone R is somewhat larger than that of the two flocculation zones F together and considerably smaller than the top area of the zone R; for instance about one quarter or one fifth thereof. Typical liquid flow velocities may then be as follows: about three feet per second in duct 18; about one to two feet per minute in the flocculation zone F; about eight to fifteen inches per minute at the bottom of the upflow zone R; and about one and a half to four inches per minute at the top of the upflow zone R. These approximate velocities of course are stated only for illustration, not for limitation. They are subject to considerable change, depending on the characteristics of the sugar juice.

At any rate, however, the liquid flow velocities are so arranged in the present unit that sludge stratification takes place in the zone R, with sludge contact mainly in the sludge bed and sludge concentration mainly in the zones B, 20. It is not desirable in sugar juice treatment, to utilize the sludge contact principle to such an extent as to enforce a homogeneous or almost homogeneous slurry in the treatment tank. This would be both difficult and dangerous. Special difficulties would be caused, in this kind of liquid treatment, by the presence of gummy and fibrous particles; and special dangers would be due to the fact that the substantial liquid retention inherent in a slurry application tends to spoil the juice under treatment. Thus a sludge contact reaction is desirable for sugar juice, but only if it takes place in an upward, expanding flow of such form and arrangement as to insure prompt sludge concentration and removal in parallel with the sludge contact. This is insured, for the substantial mud volumes involved, by the prism shaped zone described.

Preferably the flow is relatively slow, at comparable levels, as compared with the rapid agitation provided in the well-known water treatment devices of Spaulding and Montgomery et al., Patents 2,021,672 and 2,264,139; while it preferably is relatively rapid, at comparable levels, as compared with the equally well known sugar juice treatment in the devices of Seip and Copp, Patents 2,103,796 and 2,488,851.

A special initial operation is desirable, to prepare for the sludge contact treatment described. In this initial operation, all or part of the sludge accumulating in the zone B, from a constant throughput flow of juice under treatment, is retained in the tank as material to build up the sludge bed S and thus to allow the contact reaction. A rather short period of time such as 45 to 90 minutes after original filling of the tank, is usually sufficient for this purpose; and no longer retention is desirable for the reasons which have been stated.

Pursuant to this initial operation the sludge outlet motor 25 is started. (It is also possible to start it at once when the tank has been filled, but the building up and beneficial effect of the sludge bed S is then postponed, and as a result, a clarified juice of poorer quality is then obtained at least for a long time, under otherwise equal conditions.) As the motor 25 and screw 24 begin to rotate, their first effect is likely to consist in an upward expansion of the sludge, thereby establishing the operating sludge bed level. This is due to the slight agitation mentioned.

Thereafter, the screw conveyor counteracts further sludge bed expansion, by effecting a proportional removal of sludge. Its velocity can be adjusted to keep the sludge bed S at optimum depth. Optimum results have been obtained with certain types of juice, when keeping the uppermost and most dilute part of the sludge bed S just a few feet below the juice outlet means 19. At such times I have obtained clarification of sugar juice in accordance herewith, which was at least equal to and sometimes superior to that obtained simultaneously in clarifiers of earlier designs, on an equal basis as to tank space and condition of juice. The earlier clarifiers, in order to obtain such results, required superposed settling trays and multiple scraper arrangements. The present clarifier had no internal equipment except the simple partition means 15 and screw conveyor 24. It used the controlled, deep sludge bed S as described.

I have further determined the cost of complete fabrication and erection, for the present unit. They compare favorably with the costs of the earlier units of equal capacity. This applies mainly in the case of units having relatively small area and height, for which there is a great demand. The saving is largely due to the substantial reduction of heretofore required trays and mechanized equipment.

In Figs. 3 to 6 a modified sugar juice clarifier T-1 is shown. Parts designated by identical numerals are the same in this form as in the form described up to this point.

This embodiment is particularly designed for the treatment of sugar juices which tend to form a floating scum or foam in the flocculation chamber. Such a tendency may occur for instance due to the presence of particular types and amounts of solid particles or gases, or because of particular conditions which require a slow downward flow into and through the flocculation zone. It is then necessary to collect both settled mud and floating scum. While the mud or sludge is collected by an elongated screw conveyor 25 for reasons stated above, the scum is preferably concentrated and removed without moving equipment. This can be done when keeping the scum under a slight liquid head or pressure, thereby avoiding accumulation of scum at a horizontal liquid level where it would be difficult to induce a positive flow of the scum.

Therefore a submerged skimming compartment SK is shown, forming an upper part of each flocculation zone F. This compartment SK is shown as formed by (a) a generally triangular partition wall 30 extending substantially parallel with the upper, vertical part of a side wall 10 and (b) a pair of partition walls 31 generally formed as parallelograms; each wall 31 being joined to the body of said side wall with an edge 32, to an edge of the wall 30 by an edge 33, to the body of an end wall by an edge 34, and to the other wall 31 by an edge 35. The installation is such that any fine mud particles settling on the outside of the walls 30, 31 in the clarification zone R, will slide off from the walls and will not be accumulated or pocketed between them. For this purpose the skimming zone SK is formed substantially as a downwardly expanding, upwardly converging zone or pyramid. The inclination of the walls 31 of this pyramid is preferably steep in a direction parallel to the end walls, to avoid pocketing mud near the edges 34.

Adjacent the apex of the pyramid, a scum outlet pipe 36 communicates with the zone SK. The raw juice is fed to the compartment F, SK at a lower elevation by a duct 37 to provide the superposed tank space SK for scum accumulation and removal. However, it is still possible and often desirable to keep the raw juice inlet in the uppermost part of the skimming and flocculation zone. The raw juice can be introduced for instance through inlet orifices 38 distributed over the side wall.

In addition to the pronounced downward expansion of the zone SK, in a direction parallel with the side wall 10, I may provide a slight downward expansion of the zone F in a direction parallel with the end walls 11. For this purpose the partition 17 between the zones F and R may be somewhat less steeply inclined than is the lower part of the side wall 12. This is often desirable for reasons generally known from the Seip patent mentioned above.

The operation of this modified unit is the same as described, except that a skimming treatment is added. As the turbulence of the juice entering at 38 subsides, solids and gas bubbles of low specific gravity tend to rise in the chamber SK. Due to the inclination of the walls 31 they are concentrated near the scum outlet 36, and can be withdrawn periodically, or if necessary continuously.

It will be noted that some extra clarification space is gained by the upwardly converging design of the chamber SK. While the space for the flocculation chamber F is proportionally reduced overall results are sometimes improved by this particular distribution of space.

It will also be noted that two flocculation chambers F have been shown in each embodiment, but that considerable variation is possible in this respect, as well as in other features.

I claim:

1. In a sugar clarifier, a tank comprising a pair of side walls opposite one another and a pair of end walls interconnecting the side walls, the end walls being substantially vertical while at least major lower parts of the side walls converge downwardly with sufficient slope to force gravitational flow of mud, thereby forming a narrow, elongated mud zone between the lower ends of the walls; partition means extending from the top of the tank into the mud zone and having a long bottom edge in the mud zone generally parallel with the elongation of that zone, so that the partition means separates a generally narrow skimming and flocculation zone from a generally wide, upwardly expanding reaction and clarification zone, while allowing communication between these zones through the mud zone substantially throughout the horizontal extension of the latter; inlet means for sugar juice to be clarified, in an upper part of the skimming and flocculation zone; outlet means for clarified sugar juice at the top of the reaction and clarification zone; and means to shift mud substantially horizontally along the bottom of the mud zone and out of the tank.

2. In a sugar clarifier, a tank comprising a pair of side walls opposite one another and a pair of end walls interconnecting the side walls, the end walls being substantially vertical at least over major portions of their height, while at least major lower parts of the side walls converge downwardly with sufficient slope to force gravitational flow of mud, thereby forming a mud zone narrowly confined between the lower ends of the side walls horizontally elongated between the lower ends of the end walls; a pair of partitions extending from the top of the tank into the mud zone, each partition being substantially parallel with and slightly spaced from a side wall, and the pair of partitions having lower parts converging and sloping similarly to the lower parts of the side walls, to separate two generally narrow skimming and flocculation zones from an intermediate, generally wide, upwardly expanding reaction and clarification zone, while allowing communication between these zones through the mud zone substantially throughout the horizontal extension of the latter; inlet means for sugar juice to be clarified, in an upper part of each skimming and flocculation zone; outlet means for clarified sugar juice at the top of the reaction and clarification zone; and means to shift mud substantially horizontally along the bottom of the mud zone and out of the tank.

3. Apparatus according to claim 2, wherein the means to shift mud comprises an elongated worm extending along the bottom of the mud zone, and means to rotate the worm about its axis.

4. Apparatus according to claim 3, wherein the means to rotate the worm is operable at different velocities, thereby allowing adjustment of mud removal from and mud suspension in the tank.

5. In a sugar clarifier, a tank comprising a pair of side walls opposite one another and a pair of end walls interconnecting the side walls, the end walls being substantially vertical while at least major lower parts of the side walls converge downwardly with sufficient slope to force gravitational flow of mud, thereby forming a mud zone narrowly confined between the lower ends of the side walls but horizontally elongated between the lower ends of the end walls; partition means extending from the top of the tank into the mud zone, comprising a partition wall substantially parallel with and slightly spaced from a side wall and having a similarly sloping lower part, to separate a generally narrow skimming and flocculation zone from a generally wide, upwardly expanding reaction and clarification zone while allowing communication between these zones through the mud zone substantially throughout the horizontal extension of the latter; inlet means for sugar juice to be clarified, in an upper part of the skimming and flocculation zone; outlet means for clarified sugar juice at the top of the reaction and clarification zone; outlet means for scum at the top of the skimming and flocculation zone; and means to shift mud substantially horizontally along the bottom of the mud zone and out of the tank.

6. Apparatus according to claim 5, wherein an upper part of the skimming and flocculation zone expands downwardly in a direction parallel with the side walls.

7. Apparatus according to claim 5, wherein a lower part of the skimming and flocculation zone expands downwardly in a direction parallel with the end walls.

References Cited in the file of this patent

UNITED STATES PATENTS

| | | |
|---|---|---|
| 518,238 | Fullner | Apr. 17, 1894 |
| 655,338 | Gale | Aug. 7, 1900 |
| 784,450 | Uhland | Mar. 7, 1905 |
| 1,135,997 | Dorr | Apr. 20, 1915 |
| 1,459,921 | Nagel | June 26, 1923 |
| 1,665,167 | Guma | Apr. 3, 1928 |
| 1,793,510 | Raymond | Feb. 24, 1931 |

FOREIGN PATENTS

| | | |
|---|---|---|
| 217,854 | Great Britain | June 26, 1924 |